United States Patent [19]

Carroll

[11] Patent Number: 4,508,149

[45] Date of Patent: Apr. 2, 1985

[54] LOG CONVEYING APPARATUS

[76] Inventor: William R. Carroll, 2332 Bellevue Ave., West, Vancouver, B.C., Canada, V7V 1T4

[21] Appl. No.: 433,742

[22] Filed: Oct. 12, 1982

[51] Int. Cl.³ .............................................. B27B 31/00
[52] U.S. Cl. ............................ 144/245 A; 144/242 R; 198/627; 198/692
[58] Field of Search ........... 144/242 R, 245 R, 245 A; 83/435.2, 422, 446, 447; 198/627, 628, 692, 693

[56] References Cited

U.S. PATENT DOCUMENTS

| | | | |
|---|---|---|---|
| 2,600,992 | 6/1952 | Kearse | 198/692 |
| 2,664,927 | 1/1954 | Pierce | 144/242 R |
| 3,134,482 | 5/1964 | Knothe | 198/693 |
| 3,844,398 | 10/1974 | Pinat | 198/628 |
| 4,036,270 | 7/1977 | Bright | 144/246 F |
| 4,159,760 | 7/1979 | Kovacs et al. | 198/419 |

Primary Examiner—W. D. Bray
Assistant Examiner—Jorji M. Griffin
Attorney, Agent, or Firm—Townsend and Townsend

[57] ABSTRACT

Apparatus for use in the lineal feeding of logs to saws or canters has a main conveyor with an endless chain which extends up to and beyond the cutting elements of such log processing equipment. A hold-down conveyor is vertically aligned with the main conveyor and there are spring flights on an endless chain of this hold-down conveyor. Opposing runs of the two conveyors are spaced apart to grip and hold a log between the runs so that, when drive is transmitted to the chains, the log is advanced endwise and is fed through the cutting elements allowing them to cut or chip along part of or the entire length of opposite sides of the log. The apparatus has the ability to maintain a log on a fixed track relative to the saw, canter or the like and this ensures the maximum possible yield of useful lumber.

9 Claims, 6 Drawing Figures

LOG CONVEYING APPARATUS

BACKGROUND OF THE INVENTION

This invention relates to sawmill apparatus which is particularly intended for use in feeding logs to devices such as saws, canters or chipping heads operated to cut along the length of the logs.

An efficient and now fairly widely used method of cutting logs longitudinally is to feed them endwise to the cutting device and to selectively adjust the device towards and away from the longitudinal axis of each passing log. This type of cutting results in a high rate of production when the logs being processed are reasonably straight and do not vary to any great extent in diameter and so on. However, logs being used by sawmills today will often vary in both diameter and taper and have surface irregularities, all of which make it difficult to support the logs properly as they are acted upon by the cutting device.

SUMMARY OF THE INVENTION

The present invention contemplates conveying apparatus which operates to feed a continuous flow of endwise moving logs through saws or the like. Since logs being processed in a sawmill often vary in size and shape, the apparatus grips and supports the logs between a firmly based chain and an opposing chain which can yield to some extent and thus adapt itself to any minor irregularities present on the log surfaces. Furthermore, the yieldable chain is equipped with spring flights which provide a proper grip on the log and the chain itself may be supported in two sections each section adjustable relative to the other to accommodate logs which may be more misshapen than normal. However, for short logs one section will suffice, with an infeed section stopping approximately ⅝ of the log length past the last piece of process equipment.

DESCRIPTION OF THE PREFERRED EMBODIMENTS

Figure 1:
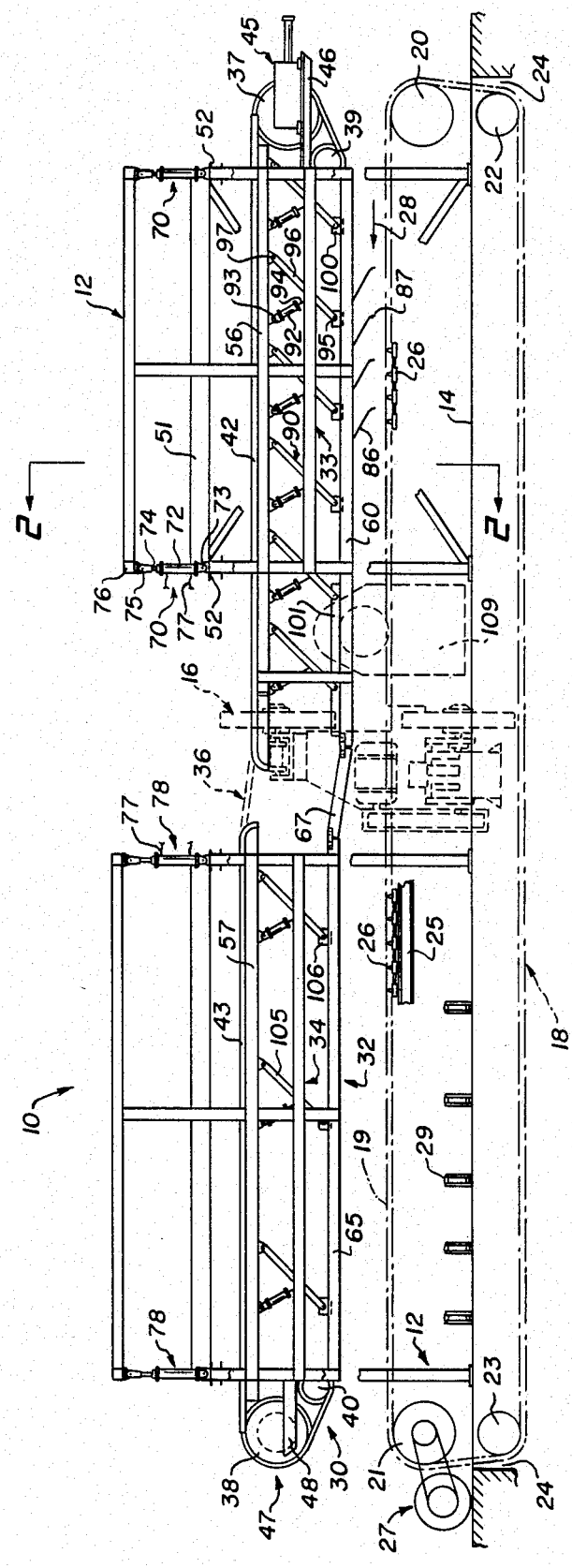
FIG. 1 is a side elevation of log conveying apparatus constructed in accordance with the present invention.

Referring to the drawings, the numeral 10 indicates generally apparatus constructed in accordance with the present invention. The apparatus 10 primarily is intended for use in cutting logs into cants, which is a name commonly given to that portion of a log which remains after slabs are removed from opposite sides of the logs. A convenient way of processing the log to perform this slab removing operation is to move the log endwise past equipment such as twin or quad band saws or twin or quad circular saws with or without chipping canters and arranged to make simultaneous cuts lengthwise of the moving log. It will be noted that some mills prefer to chip away the side edge slabs using similarly arranged chipping machines known to the industry as canters. The saws or canters are spaced apart along the path of travel of the log and associated with the piece of equipment is a setworks which allows the cutting elements of the processing equipment to be adjusted towards or away from the longitudinal axis of the log, thus regulating the depth of cut. The skilled man will appreciate that in the illustrated embodiment the saws may be replaced by canters.

The present apparatus is shown as comprising a framework 12 which is erected on the floor 14 of a sawmill. This open framework straddles twin band saws 16 which are arranged side by side in the manner best indicated by dotted lines in FIG. 2. A conventional main conveyor 18 of the present apparatus is also mounted on the floor of the mill to extend longitudinally through the center of the open framework. The conveyor indicated generally at 18 has a single endless chain 19 trained over sprockets 20 and 21 suitably mounted at opposite ends of the framework. Other idler sprockets 22 and 23 are located below the floor 14 which has a slot 24 through which the chain extends. The upper run of the chain is slidably supported on a bearer 25 which extends longitudinally through the framework between the sprockets 20 and 21. Log engaging teeth 26 are provided on the chain 19 to grip a log seated on the upper run which normally is in contact with substantially the entire length of the log. The endless chain 19 is driven by means generally indicated at 27, for example a hydraulic motor, so that the upper run of the chain moves in a direction of feed indicated by the arrow 28 which appears in FIG. 1, thus propelling the longitudinally extending log endwise up to and beyond the saws 16.

Logs are delivered to the conveyor 18 by being moved endwise up to the intake end of the framework which is on the right of FIG. 1. The logs transferred on to the upper run of the chain are moved between the appropriately spaced saws 16 to the opposite or left end of the conveyor where the cants are discharged. The slabs cut from the sides of the logs by the saws drop onto lateral conveyors 29 which operate to move the slabs sideways clear of the framework to other discharge points.

The logs must be prevented from rolling sideways off the single and longitudinally extending chain 19 of the main conveyor and this is done by means of a hold-down conveyor 30 which is located within the framework 12 above the main conveyor. The conveyor 30 is supported by a structure generally indicated at 32, this structure being carried within the framework and comprising an infeed frame 33 and an outfeed frame 34. An endless chain 36 of the hold-down conveyor extends around sprockets 37 and 38 journalled at opposite ends of the support structure 32 above the corresponding sprockets of the main conveyor. Relatively small sprockets 39 and 40 also carried by opposite ends of the structure 32 support the lower run of the chain 36 spaced a suitable distance from and extending parallel to the upper run of the main conveyor. Guide channels 42 and 43 are provided on the infeed and outfeed frames 33 and 34 respectively and the upper run of the chain 36 is slidably supported in these guide channels. Tension of the chain 36 is adjustable by means of a hydraulic take up device 45 which is mounted on a bracket 46 projecting from the infeed frame, the device carrying the sprocket 37. Device 45 need not be hydraulic. It can be operated mechanically or pneumatically. Such tensioning devices are well known. The hold-down conveyor is driven by means generally indicated at 47 and preferably comprising a hydraulic drive unit mounted on a bracket 48 which projects from the outfeed frame, the unit turning the sprocket 38 to drive the lower run of the hold-down conveyor chain at the same speed and in the same direction of travel as the upper run of the main conveyor. Drive means 47 may also be operated electrically or by any similar conventional means.

Figure 2:
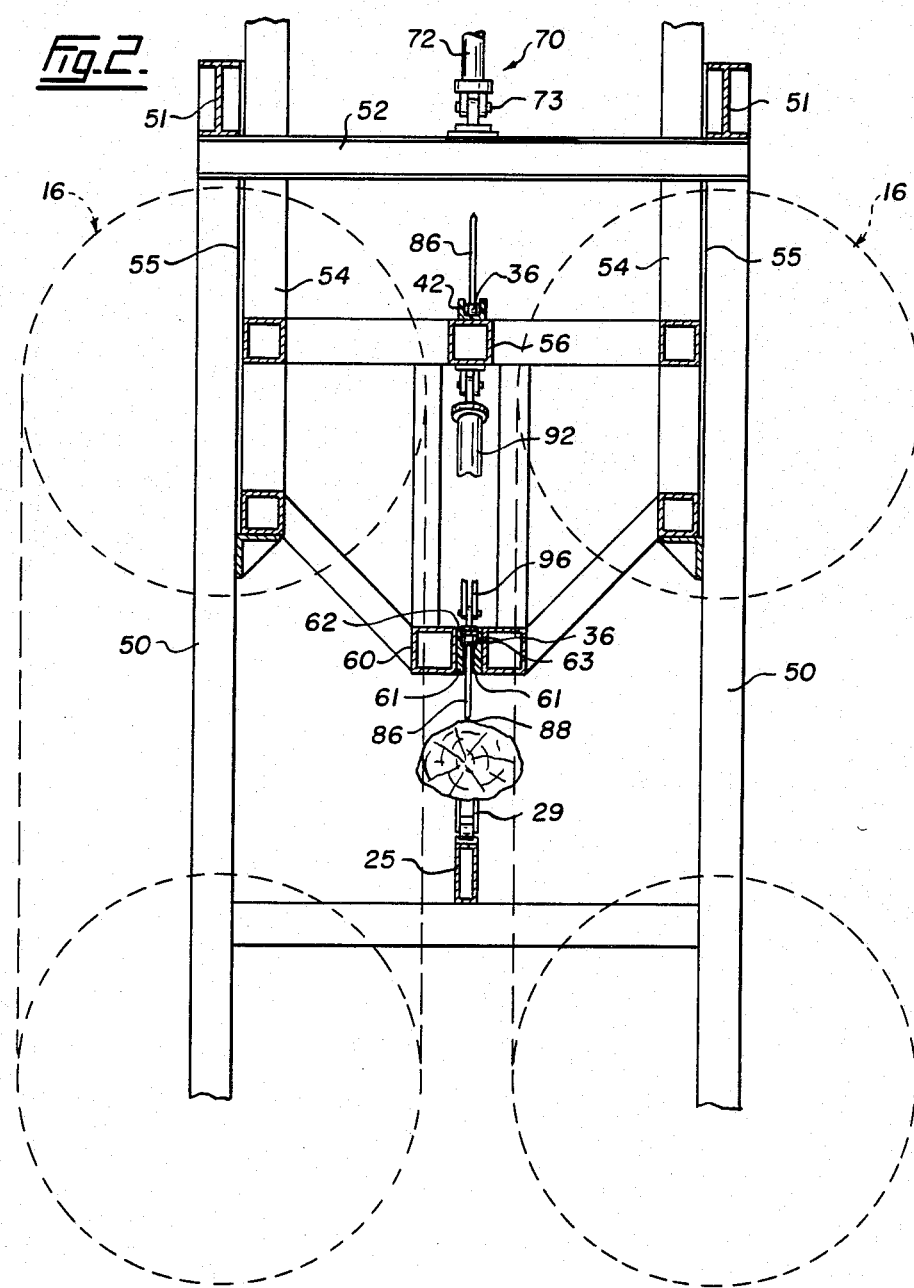
FIG. 2 is a vertical section taken on the line 2—2 of FIG. 1.

The infeed frame 33 of the support structure is movable between columns 50 provided on the sides of the framework 12, see particularly FIG. 2, these transversely spaced columns being connected at the top by longitudinal side members 51 as well as by transverse members 52. At each pair of side members 50, the infeed frame appears in cross section as shown in FIG. 2 where upright side members 54 of the frame will be seen to be fitted with wear strips 55 which ensure easy sliding movement of the frame on the columns 50. The guide channel 42 for the chain 36 is carried at the center of the frame 33 on a longitudinal member 56. A similar member 57 (FIG. 1) on the outfeed frame carries the other side channel 43 for the hold-down conveyor chain.

Longitudinal members 60 extend along the bottom of the infeed frame, these parallel members being transversely spaced apart and lined on their opposing faces with wear strips 61. Strips 61 are also transversely spaced apart and otherwise shaped to define a longitudinally extending guide slot 62 open at the top and bottom and provided with shoulders 63 about midway therebetween as shown best in FIG. 2. Other members 65, see FIG. 1, are carried by the outfeed frame to support similar wear strips (not individually shown) defining an extension of the guide slot 62 and the lower run of the hold-down conveyor slidably extends through the longitudinally aligned slots of the infeed and outfeed frames.

The outfeed frame 34 of the hold-down conveyor is constructed in substantially the same manner as the infeed frame and, in FIG. 1, the spaced apart ends of the guide channels 42 and 43 are shown downwardly turned and spanned by the upper run of the hold-down conveyor chain 36. The lower run of the chain 36 rides over a bridge piece 67 which pivotally and extensibly connects adjacent ends of the two longitudinally aligned guide channels so that those ends can be disposed at different levels if circumstances dictate.

The infeed frame 33 is adapted to be raised and lowered by power devices generally indicated at 70. Each of these devices comprises a hydraulic cylinder 72 which is pivotally mounted as at 73 on the cross members 52 at one end of the frame. The centrally disposed cylinder has a piston rod 74 and a pivot connection 75 secures the rod to the underside of a cross member 76 on the top of the framework 12. The double acting cylinders 72, which are located in the center of the infeed frame, are included in a suitable hydraulic circuit indicated at 77 in FIG. 1 only. The foregoing arrangement allows the infeed frame which carries the hold-down conveyor to be moved vertically as will be explained later but it should be noted that the frame and conveyor are not required to move up and down horizontally. In other words, the pivotal connection provided for the device 70 allows the infeed frame 33 to swing slightly on the framework and to tilt so that one end of the hold-down conveyor can be at a higher level than the opposite end of the conveyor.

The outfeed conveyor 34 is also provided with power devices 78 which enable it to be moved up and down as well as to swing within the framework. Since these devices 78 are constructed and arranged as previously described, no further explanation will be given although the devices are also included in the hydraulic circuit 77.

Figure 3:
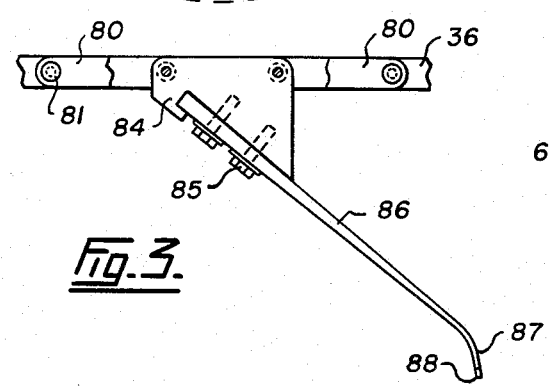
FIG. 3 is an enlarged side elevation showing a spring flight for a hold-down conveyor chain of the apparatus.

Referring now particularly to FIG. 3, the chain 36 of the hold-down conveyor will be seen to be constructed of links 80 consisting of transversely spaced side bars which are interconnected by countersunk rivets 81. Some of the links of the chain, for example every fourth link, are replaced by a triangular lug 84 and, secured to each lug by bolts 85, is a spring steel flight 86 which is inclined away from the direction of travel of the chain link 80 at angle of about 45°. The flights have free ends 87 which are radiused as shown in FIG. 3, that is, curved slightly towards the direction of travel of the chain links and the very tips of those free ends are hollow ground to provide transversely spaced prongs 88. This free end can be constructed with a single point, or any other shape able to hold a log by digging into the log.

Referring again to FIG. 2, the lower run of the hold-down conveyor chain 36 will be seen partly lodged in the guide slot 62 of the infeed frame. The chain slides along the slot in contact with the shoulder 63 so that the lower run of the chain cannot move downwardly below the position shown. At this time, the spring flights 86 on the lower run project through the slot 62 so that their tips are located above and in vertical alignment with the upper run of the main conveyor chain 19. In FIG. 1, the flights 86 are shown projecting away from the direction of feed indicated by the arrow 28 with the free ends 87 curving slightly in the opposite direction.

The above mentioned arrangement makes it desirable to cushion the hold-down conveyor chain against undue upward thrust which may be exerted by an unusually distorted passing log and, in the present apparatus, this cushioning, if needed, may be done by means generally indicated at 90. The cushioning means 90 is shown in FIGS. 1 and 2 as comprising a number of air cylinders 92 which are spaced along the infeed frame 33 at suitable intervals. Each cylinder 92 is pivotally connected as at 93 to the underside of the longitudinal member 56. The cylinder slopes downwardly towards the infeed end of the hold-down conveyor and a piston rod 94 of the cylinder is secured by a pivot pin 95 to a lever 96 which is also secured by a pivot connection 97 to the member 56. Most of the levers are fitted at their lower ends with pivotally mounted shoes 100 which are shaped to loosely grip and slidably support the top edge of the lower run of the hold-down conveyor. Desirably, the two levers 96 nearest the saw 16 are fitted with an elongated shoe 101 which serves to hold the chain in reasonably close the bridge piece 67 regardless of any difference in elevation between the infeed and outfeed frames.

Figure 4:
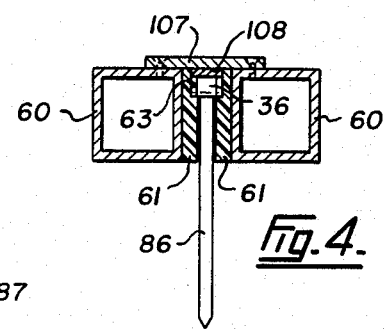
FIG. 4 is a detail of a modification of the invention.

The outfeed frame 34 may be cushioning or hold down of the chain 36 on frames 33 and 34 can also be achieved by a continuous strip of plastic polyethylene, as shown in FIG. 4. Such arrangement, which avoids the necessity of cylinders 92, levers 96 and the attendant hardware, includes a cover plate, for example of steel, 107 secured to the upper surfaces of member 60. A strip 108 of a low friction material, for example ultra high molecular weight polyethylene, is attended to cover plate 107 to contact chain 36.

As indicated a canter may be used in place of saws 16 and a canter 109 is shown diagrammatically in FIG. 1. Another canter (not shown) will be opposed to canter 109.

The present log conveying apparatus operates effectively in processing a lineal flow of logs which can be moving rapidly with only a short interval between the ends of the logs. Preferably, the logs are scanned using conventional scanning equipment which gathers the necessary data regarding log diameter, taper, offset and so on. This information is fed to a computer having a memory bank in which information regarding appropriate positioning of the frames 33 and 34 is stored. The computer processes the information received and then signals certain controls associated with the power devices 70 and 78 so that the hold-down conveyor frames are adjusted automatically according to the size and shape of the log. Other signals may be sent by the computer to the setworks controlling the saws 16 or canters so that those saws may be adjusted with regard to the transverse spacing between their cutting blades.

Figure 5:
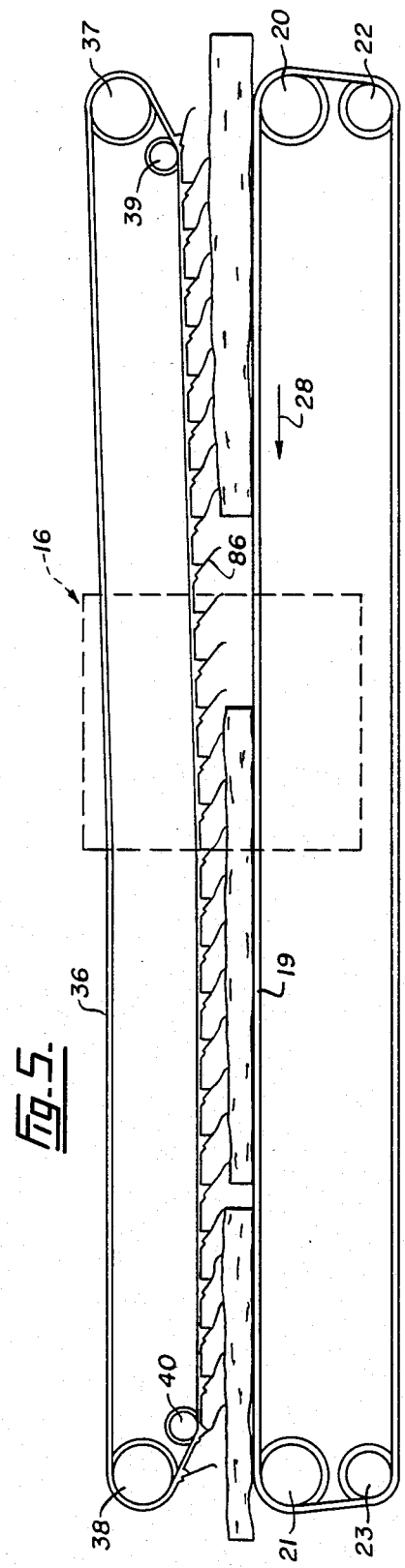
FIG. 5 is a schematic view showing the apparatus processing logs of varying diameter.

In schematic FIG. 5, the apparatus 10 is illustrated at would appear when used to cut a run of logs of varying diameter. Such logs are conveyed up to the apparatus and, while still a suitable distance away, the logs are scanned and the infeed and outfeed frames are adjusted vertically and tilted as required to receive the leading end of the first log. The counter-rotating chains 19 and 36 are met by the log end so that the log is centered over the main conveyor chain and the flights 86 swing down into clamping engagement with the top of the log. As this occurs, the spring flights are flexed slightly and the transversely spaced prongs 88 on the tips of the flight dig into the log surface to some extent thereby obtaining a firm grip. The chain 36 and the flights 86, of course, are vertically aligned and are centered along the length of the log which is moved in the direction of feed or towards the twin band saws 16 or canter 109. The upper and lower runs of the two endless chains pass between the transversely spaced saws or canters 109 leaving all but the very center of the log clear of the saw blades. This arrangement ensures that the log is firmly gripped and held against rotation as the band saws or canter act to remove the two side edge slabs which will leave the cant suitably supported by the outfeed end of the apparatus. The two frames supporting the hold-down conveyor chain are raised and lowered auto-matically as previously described and are tilted with respect to the upper run of the main conveyor chain and also with respect to one another if necessary to handle the run of logs of varying diameter.

Figure 6:
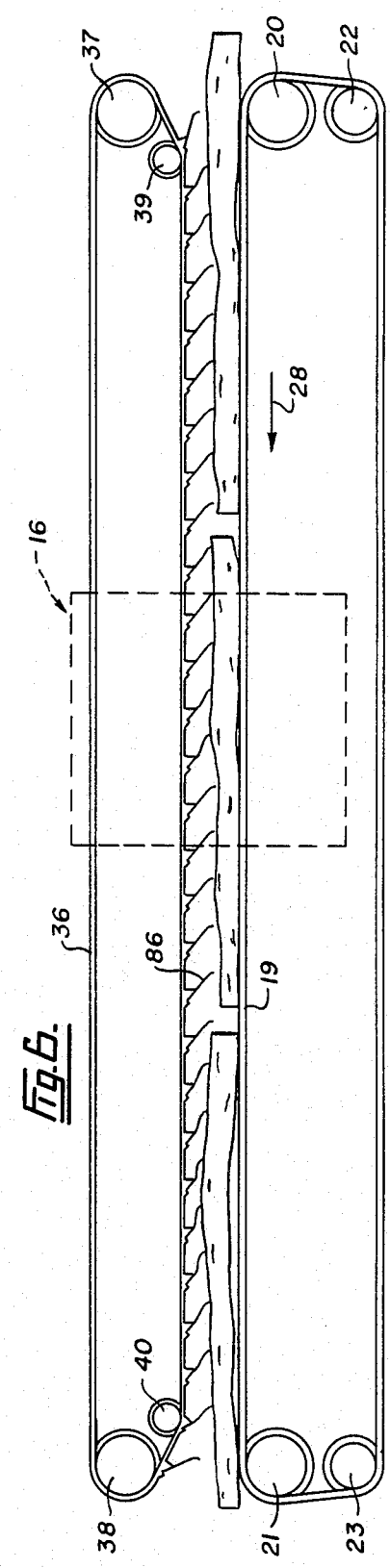
FIG. 6 is another schematic view showing the apparatus processing logs of irregular shape.

FIG. 6 is a schematic view showing logs being processed which are about roughly the same diameter but which have offset portions and are otherwise irregular in shape. The apparatus can handle such logs as readily as most other logs and operates in the previously described manner to do so, that is, the infeed and outfeed frames are adjusted automatically to accommodate the rapidly moving but irregularly shaped logs. If a bump on one log exerts excessive upward pressure on the lower run of the hold-down conveyor, the cushioning means 90 operates to allow the chains to raise slightly and thus relieve the strain which might otherwise be imposed on the spring flights which still allows the flights to maintain a proper grip on the top surface of the log.

The present invention provides an apparatus that can feed a variety of logs to saws, canters, or chipping heads without the necessity of frequent manual adjustment or close supervision by an operator. The arrangement of the flights of spring material mounted on a conveyor, a vertically movable top chain guide, the ability to move the top chain guide longitudinally of the apparatus provides an apparatus in which the log is restrained from moving sideways or from rotating while moving longitudinally of the apparatus, including during the cutting process. This accurate tracking of the log through the apparatus maximizes recovery of available lumber and, furthermore, the apparatus of the present invention does not require any premachining of the log to achieve this result. The invention also provides a top hold-down for the log that achieves rigid sideways support for optimum cutting accuracy and maximum recovery and yet the support is narrow enough to pass through twin cutting means, band saws or the like, spaced to cut one board, flitch, cant or timber on edge.

I claim:
1. Apparatus for conveying logs to processing equipment in a sawmill comprising:
   a main conveyor to carry the logs having an endless chain intersecting the processing equipment,
   a hold-down conveyor arranged above the main conveyor and having an endless chain,
   spring flight means mounted on the endless chain of the hold-down conveyor, said endless chains having opposing runs spaced apart to receive and support a log extending longitudinally therebetween with the spring flight means flexed into gripping engagement with the surface of the log,
   support structure supporting the hold-down conveyor for movement towards and away from the main conveyor, and hoisting means associated with the support structure for moving the hold-down conveyor to selectively vary the spacing between the opposing runs, and
   means for driving the main and hold-down conveyors to advance the opposing runs in unison and move the log endwise in an accurately controlled fashion into feeding engagement with the processing equipment.

2. Apparatus as claimed in claim 1, and including cushioning means for exerting yielding pressure substantially throughout the length of the opposing run of the hold-down conveyor to resist movement of said opposing run away from the opposing run of the main conveyor.

3. Apparatus as claimed in claim 1, in which said support structure comprises infeed and outfeed frames longitudinally spaced apart on opposite sides of the processing equipment, said endless chain of the hold-down conveyor being supported by the infeed and outfeed frames, and said hoisting means being operable to individually move the infeed and outfeed frames.

4. Apparatus as claimed in claim 1 including means to prevent the spring flight means from moving upwardly.

5. Apparatus as claimed in claim 4 in which the means comprises a low friction contact surface, spaced above the log as it moves endwise, and positioned to contact the endless chain of the hold down conveyor to resist upward movement of the chain.

6. Apparatus for conveying logs to processing equipment in a sawmill comprising:
   an elongated framework intersected by the processing equipment,
   a main conveyor extending through the elongated framework, said main conveyor having an endless chain including a substantially horizontal upper run for seating a longitudinally extending log, a top hold-down conveyor having an endless chain provided with longitudinally spaced spring flight means flexed into gripping engagement with the surface of the log for engaging and locating a log seated on the upper run of the main conveyor, said endless chain of the top hold-down conveyor having a lower run spaced from and normally adapted to extend parallel to the upper run of the main conveyor, an infeed frame supporting a first portion of the hold-down conveyor in advance of the processing equipment, an outfeed frame supporting a second portion of the hold-down conveyor beyond the processing equipment, hoisting means suspending the infeed and outfeed frames from the elongated framework and operable to separately raise and lower the first and second portion of the hold-down conveyor whereby to vary the spacing between the upper and lower runs and to incline the upper run at the first and second portions with respect to the lower run of the main conveyor; and means for driving the main and hold-down conveyors to advance the upper and lower run in unison and move the log endwise into feeding engagement with the processing equipment.

7. Apparatus as claimed in claim 6, and including cushioning means on the infeed and outfeed frames for exerting a yielding pressure to the lower run of the top hold down conveyor substantially throughout the length of the lower run.

8. Apparatus as claimed in claim 6, in which each of said spring flight means comprises a length of spring material having a base end and a tip, securing means anchoring the base end to a length of the conveyor chain with the length of spring material directed away from the direction of travel of the log, and said length of spring material curving towards the direction of travel near the tip, said tip being shaped to dig into the surface of the log.

9. Apparatus as claimed in claim 6, and including cushioning means on the infeed and outfeed frames for exerting yielding pressure substantially throughout the length of the upper run in a downward direction, said infeed and outfeed frames having guide members for the lower run of the top hold down conveyor limiting movement of said run in a downward direction.

* * * * *